(12) United States Patent
Siraisi et al.

(10) Patent No.: US 11,148,881 B2
(45) Date of Patent: Oct. 19, 2021

(54) ARTICLE TRANSPORT FACILITY

(71) Applicant: Daifuku Co., Ltd., Osaka (JP)

(72) Inventors: Tooru Siraisi, Tokyo (JP); Norihiro Okatsu, Tokyo (JP); Masahiro Sato, Tokyo (JP); Masaru Yagi, Tokyo (JP); Makoto Kawamoto, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 202 days.

(21) Appl. No.: 16/517,784

(22) Filed: Jul. 22, 2019

(65) Prior Publication Data

US 2020/0048000 A1 Feb. 13, 2020

(30) Foreign Application Priority Data

Aug. 7, 2018 (JP) .............................. JP2018-148760

(51) Int. Cl.
*B65G 1/04* (2006.01)
*B65G 1/137* (2006.01)
*G06Q 10/08* (2012.01)
*B65G 1/02* (2006.01)

(52) U.S. Cl.
CPC ............ *B65G 1/137* (2013.01); *B65G 1/023* (2013.01); *B65G 1/0485* (2013.01); *G06Q 10/08* (2013.01)

(58) Field of Classification Search
CPC .................................................. B65G 1/0485
See application file for complete search history.

(56) References Cited

U.S. PATENT DOCUMENTS

| | | | | |
|---|---|---|---|---|
| 5,953,234 A | * | 9/1999 | Singer .................. | B65G 1/1378 700/214 |
| 7,261,509 B2 | * | 8/2007 | Freudelsperger .... | B65G 1/0407 414/269 |
| 8,682,476 B2 | * | 3/2014 | Freudelsperger .... | B65G 1/1378 700/218 |
| 9,266,675 B2 | * | 2/2016 | Yamashita ........... | B65G 1/0492 |
| 9,315,323 B2 | * | 4/2016 | Schubilske .......... | G06Q 10/087 |
| 9,555,967 B2 | * | 1/2017 | Stevens .................... | B65G 1/04 |
| 9,957,107 B2 | * | 5/2018 | Peng .................... | B65G 1/0485 |

(Continued)

FOREIGN PATENT DOCUMENTS

JP 201540129 A 3/2015

*Primary Examiner* — Mark C Hageman
(74) *Attorney, Agent, or Firm* — The Webb Law Firm

(57) ABSTRACT

Each of a plurality of automated storages includes: storage shelves with multiple levels; a plurality of transport carriages; a plurality of relay portions; and a lift base capable of being raised and lowered. A transport device includes a plurality of transport conveyors. Each of the plurality of transport conveyors includes: a plurality of receiving portions configured to receive articles; a loading portion configured to deliver articles transported by the transport conveyor and to load the articles to the automated storages; and a transport portion configured to transport articles received at the receiving portions to the plurality of loading portions. The transport portion included in each of the plurality of transport conveyors is installed such that a movement trajectory of articles transported by the transport portion does not overlap a movement trajectory of articles transported by another transport portion. A plurality of loading portions that deliver articles to the lift base of each one of the automated storages are installed at different heights.

8 Claims, 11 Drawing Sheets

(56) References Cited

U.S. PATENT DOCUMENTS

| | | | |
|---|---|---|---|
| 10,259,648 B2* | 4/2019 | Wolf | F25D 13/06 |
| 10,526,143 B2* | 1/2020 | Salichs | B65G 1/06 |
| 2012/0009047 A1* | 1/2012 | Ogawa | B65G 1/065 |
| | | | 414/267 |
| 2012/0141236 A1* | 6/2012 | Korner | B65G 1/0485 |
| | | | 414/222.01 |
| 2012/0328397 A1* | 12/2012 | Yamashita | B65G 1/065 |
| | | | 414/282 |

* cited by examiner

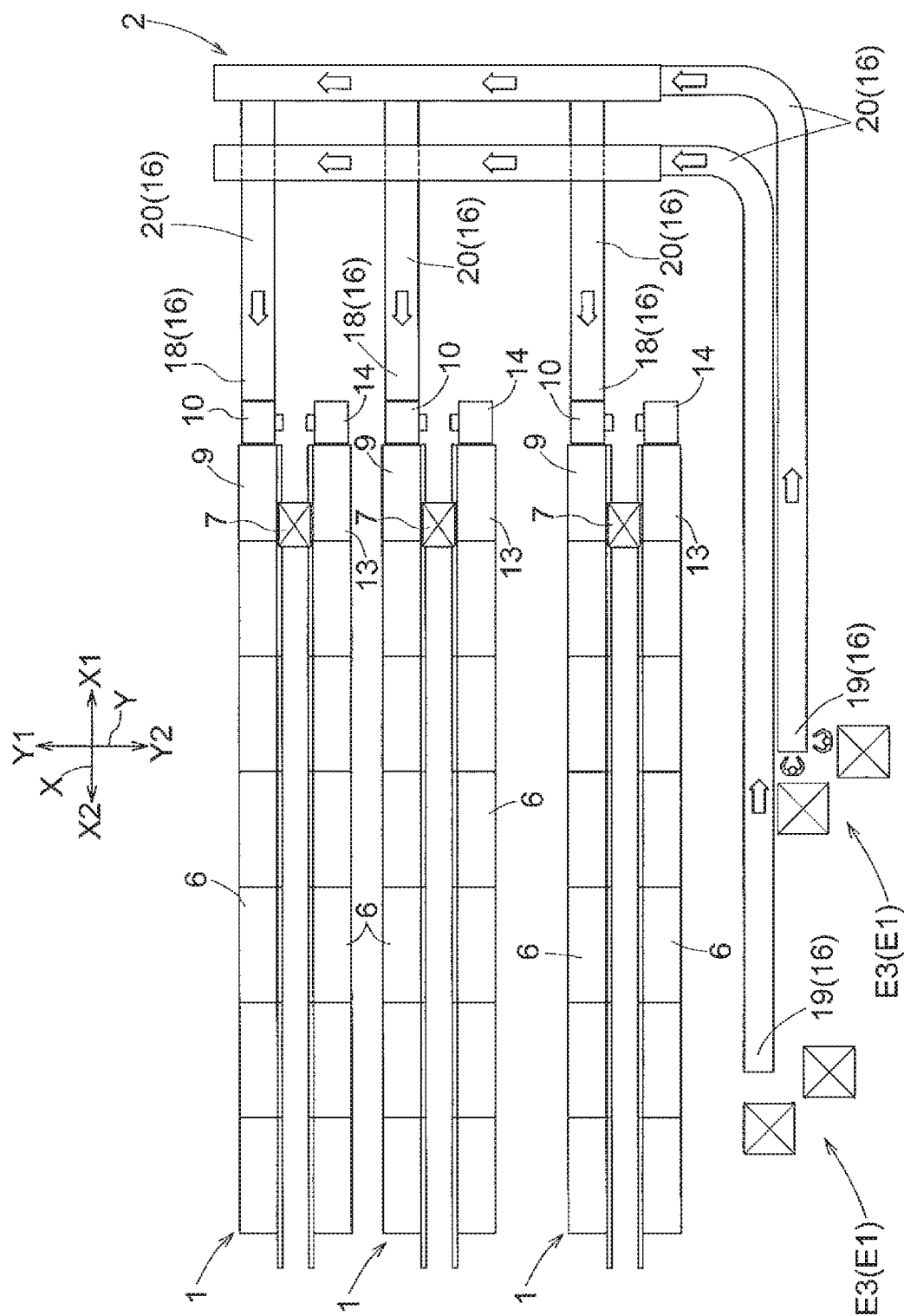

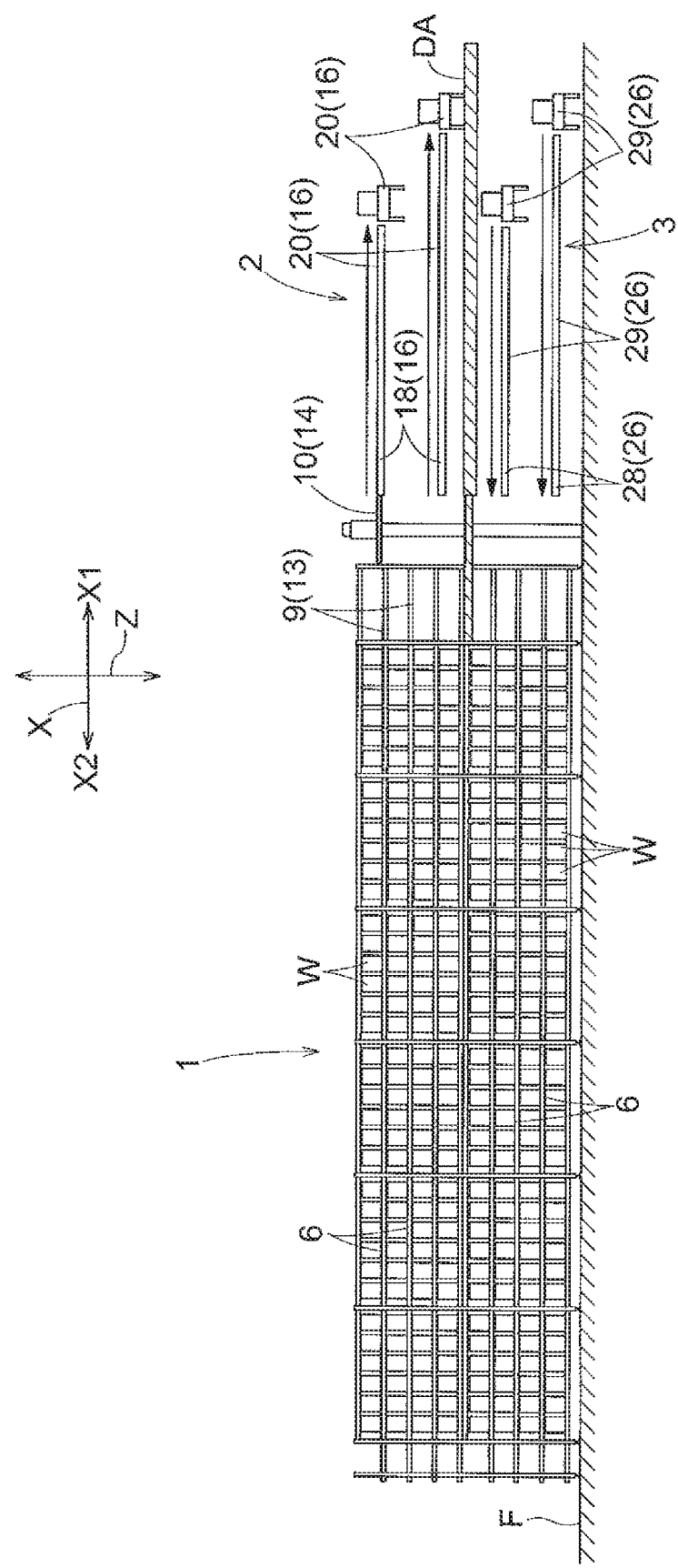

ARTICLE TRANSPORT FACILITY

CROSS-REFERENCE TO RELATED APPLICATION

This application claims priority to Japanese Patent Application No. 2018-148760 filed Aug. 7, 2018, the disclosure of which is hereby incorporated by reference in its entirety.

BACKGROUND OF THE INVENTION

1. Field of the Invention

The present invention relates to an article transport facility that includes a plurality of automated storages and a transport device for transporting articles that are to be loaded into the plurality of automated storages.

2. Description of the Related Art

A conventional example of such an article transport facility is described in JP 2015-040129A (Patent Document 1). The article transport facility in Patent Document 1 includes a transport conveyor (refilling conveyor 3). The transport conveyor includes a loading portion for delivering articles (container C) that have been transported by this transport conveyor to a lift base (12) of an automated storage (1) to load the articles into the automated storage, and a plurality of transport portions for transporting the article to the loading portion. A transport conveyor of this kind may include a plurality of receiving portions for receiving articles. In this case, articles W received at the plurality of receiving portions are made to merge into a transport portion, then branched into a plurality of loading portions, and are transported to the plurality of loading portions. By configuring the transport conveyor in such a manner, articles received at the plurality of receiving portions can be loaded into any of a plurality of automated storages.

SUMMARY OF THE INVENTION

In the above-described article transport facility, all of the articles to be loaded into the plurality of automated storages are first gathered at one transport portion, and are then transported to the loading portions. If there are many receiving portions, there are also many articles that are to be made to merge into the transport portion from the plurality of receiving portions. For this reason, articles often jam when merging into the transport portion, and it is difficult to efficiently transport the articles received at the receiving portions.

There is, therefore, a demand for the realization of an article transport facility that makes it possible to efficiently transport articles received at the receiving portions.

Characteristic configurations of an article transport facility in view of the foregoing situation lie in that the article transport facility includes: a plurality of automated storages; and a transport device configured to transport articles to be loaded into the plurality of automated storages, wherein each of the plurality of automated storages includes: storage shelves with multiple levels arranged in a vertical direction; a plurality of transport carriages configured to travel in a longitudinal direction of the storage shelves, the plurality of transport carriages being installed at the respective multiple levels; a plurality of relay portions installed at the respective multiple levels; and a lift base capable of being lifted and lowered, and is configured to load, at each of the multiple levels, articles from outside the automated storage to the lift base, to transport the articles from the lift base to the relay portions, with the lift base having been raised or lowered to heights corresponding to the relay portions, and to transport the articles from the relay portions to the storage shelves using the transport carriages, the transport device includes a plurality of transport conveyors, each of the plurality of transport conveyors includes: a receiving portion configured to receive articles; a plurality of loading portions configured to deliver articles transported by the transport conveyor to the lift bases of the plurality of automated storages, and to load the articles to the automated storages; and a transport portion configured to transport articles received at the receiving portion to the plurality of loading portions, the transport portion included in each of the plurality of transport conveyors is installed such that a movement trajectory of articles transported by the transport portion does not overlap a movement trajectory of articles transported by another transport portion, and a plurality of the loading portions that deliver articles to the lift base of each one of the automated storages are installed at different heights.

According to these characteristic configurations, the transport device is provided with the plurality of transport conveyors that transport articles from the receiving portions to the plurality of loading portions. Since each of the plurality of transport conveyors includes the loading portions for the respective automated storages, articles transported by each transport conveyor can be loaded into any of the plurality of automated storages.

Articles to be loaded into the plurality of automated storages are transported to the plurality of loading portions by the plurality of transport conveyors, and thus, the number of articles transported by each one of the transport conveyors is reduced. Thus, it is unlikely that the articles will jam when being transported by the plurality of transport conveyors, and articles received at the receiving portion can be efficiently transported to the loading portions.

Also, the movement trajectory of articles transported by the transport portion of each of the plurality of transport conveyors does not overlap the movement trajectories of articles transported by the other transport portions. Thus, for example, articles that are being transported by the plurality of transport conveyors will not interfere with each other: e.g. an article does not move between two transport conveyors. Accordingly, articles received at the receiving portions can be efficiently transported to the loading portions in this regard as well.

BRIEF DESCRIPTION OF THE DRAWINGS

FIG. 10 is a plan view illustrating a first transport device in the article transport facility according to the third embodiment.

FIG. 11 is a front elevational view of the article transport facility according to the third embodiment.

DETAILED DESCRIPTION OF PREFERRED EMBODIMENTS

1. First Embodiment

The first embodiment of the article transport facility will be described based on the drawings.

Figure 1:
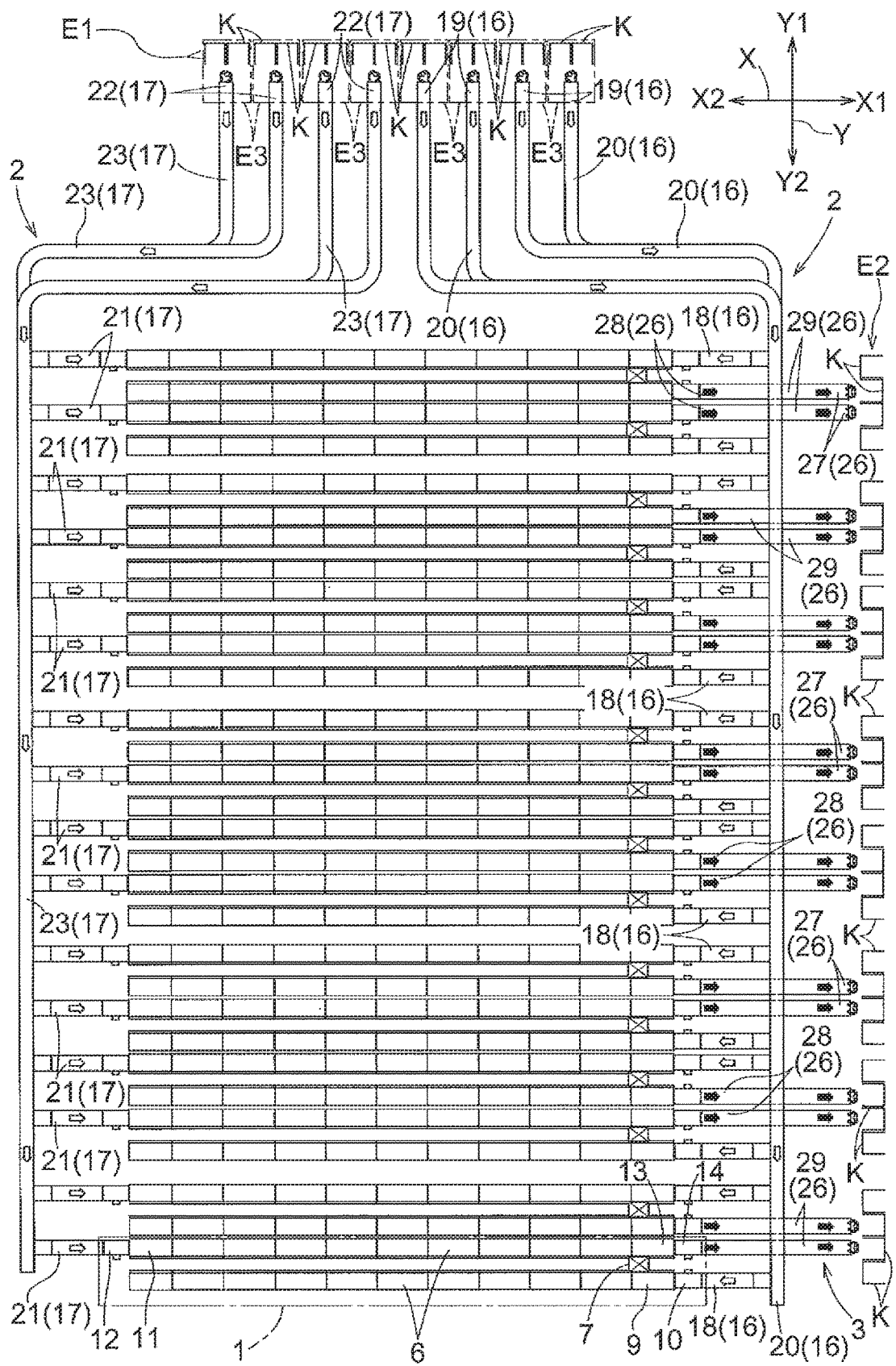
FIG. 1 is a plan view of an article transport facility according to a first embodiment.
Figure 2:
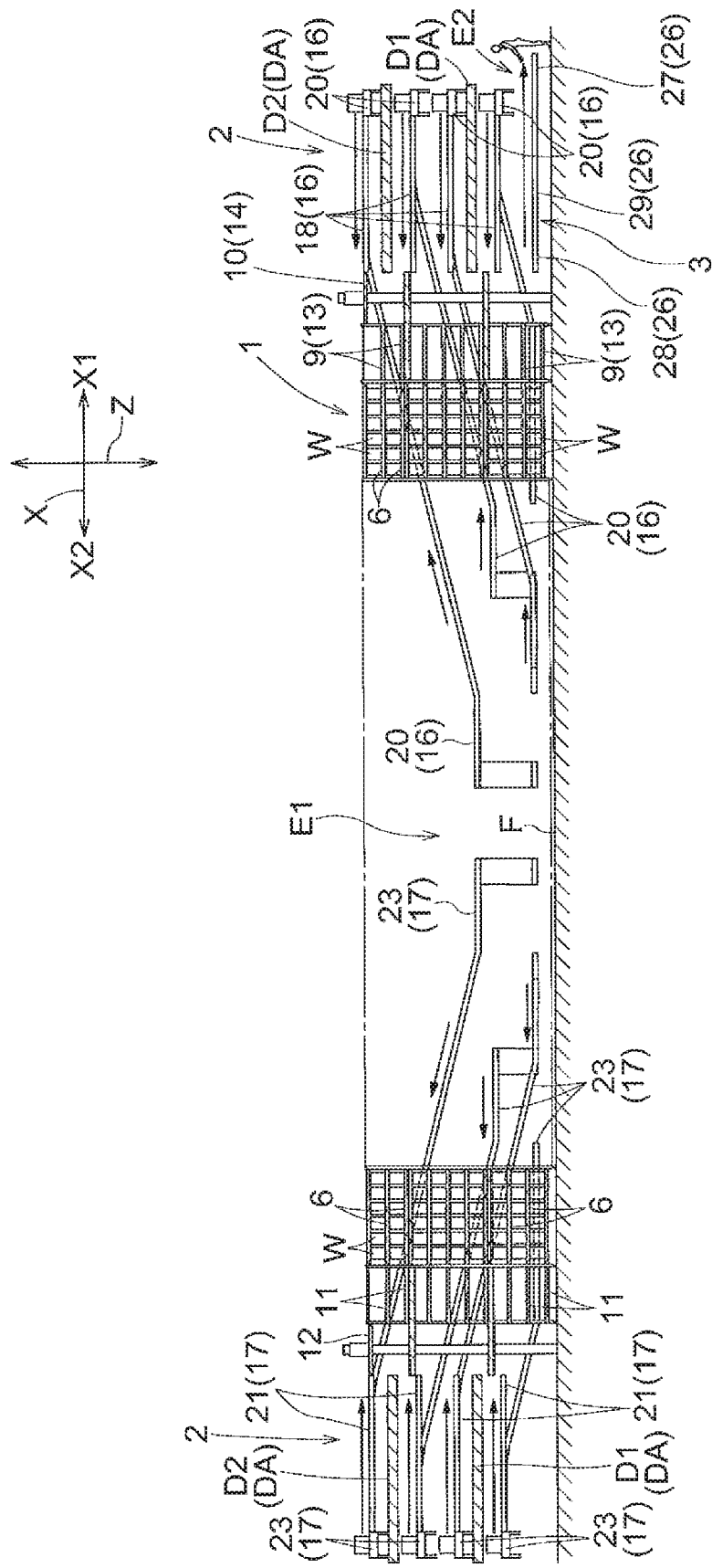
FIG. 2 is a front elevational view of the article transport facility according to the first embodiment.
Figure 3:
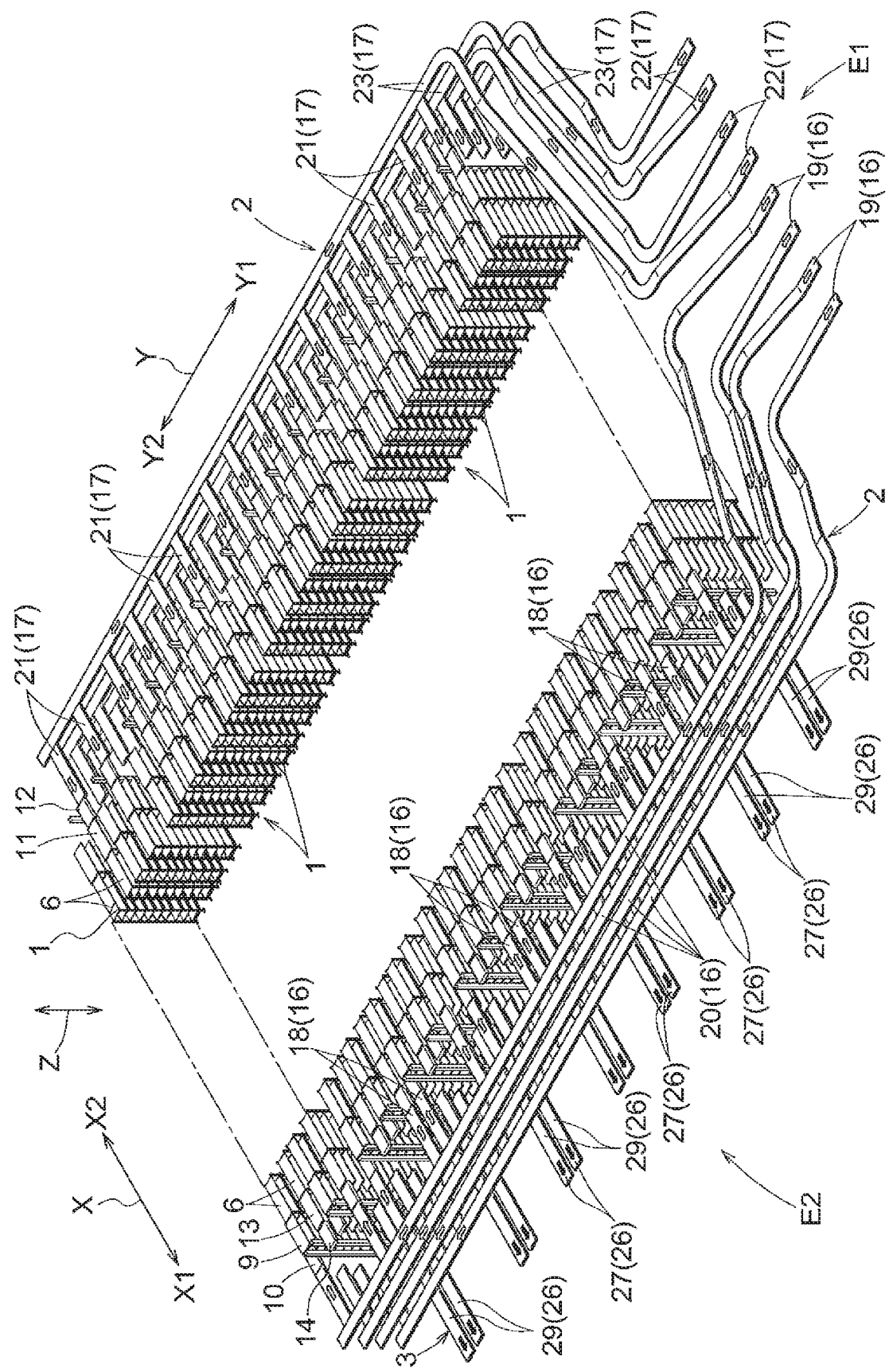
FIG. 3 is a perspective view of the article transport facility according to the first embodiment.
Figure 4:
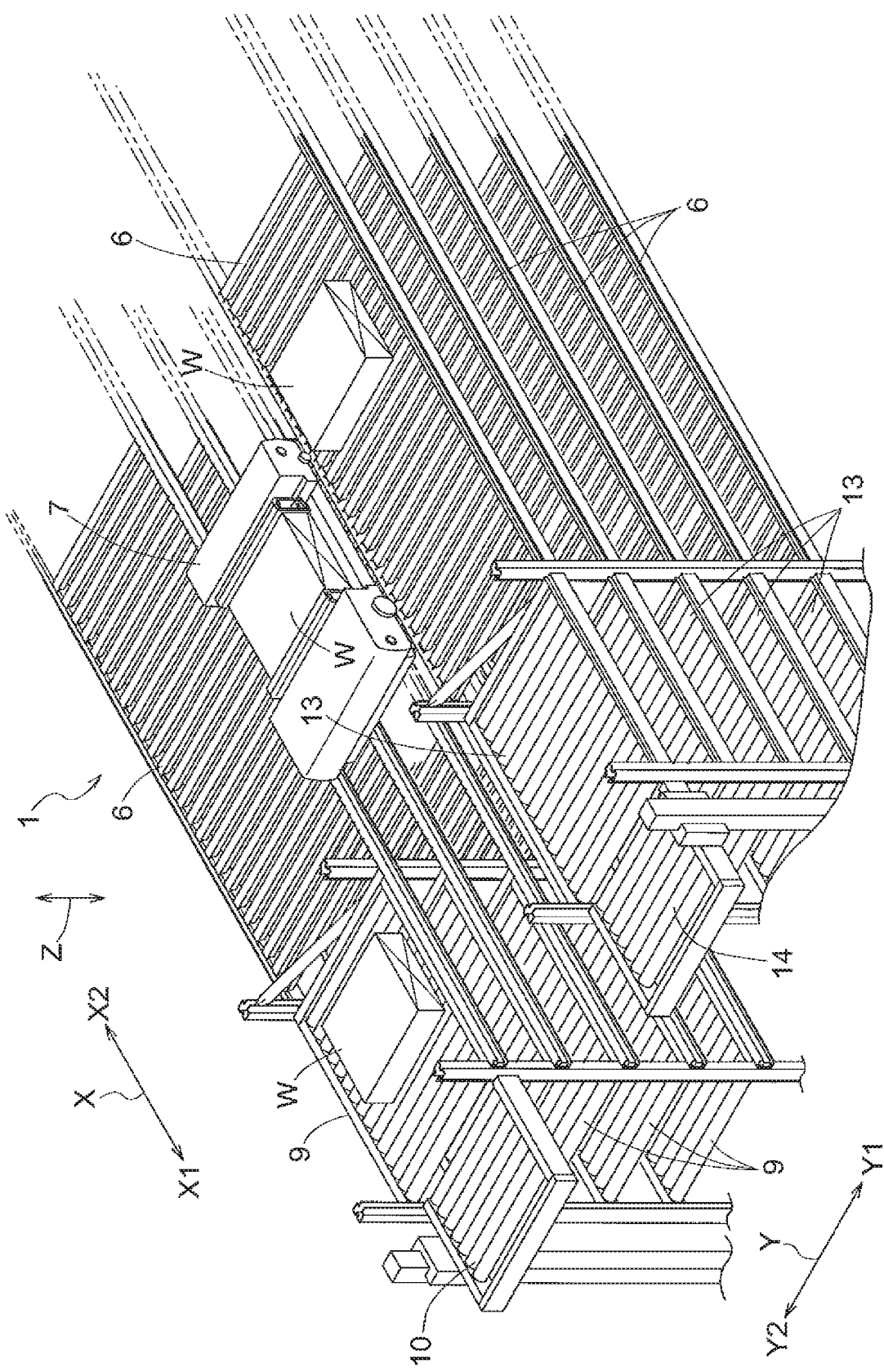
FIG. 4 is a perspective view of an automated storage according to the first embodiment.

As shown in FIGS. 1 to 3, the article transport facility includes a plurality of automated storages 1, a loading transport device 2 serving as a transport device for transporting articles W to be loaded into the plurality of automated storages 1, and an unloading transport device 3 serving as a second transport device for transporting articles W to be unloaded from the plurality of automated storages 1.

In the following description, the direction in which the plurality of automated storages 1 are arranged as viewed in the vertical direction Z will be referred to as a width direction Y, and a direction perpendicular to the width direction Y will be referred to as a longitudinal direction X. A direction toward one side in the longitudinal direction X will be referred to as a first longitudinal direction X1, and a direction toward the other one side in the longitudinal direction X will be referred to as a second longitudinal direction X2. A direction toward one side in the width direction Y will be referred to as a first width direction Y1, and a direction toward the other one side in the width direction Y will be referred to as a second width direction Y2.

1-1. Automated Storage

As shown in FIGS. 1 to 4, each of the plurality of automated storages 1 includes multiple-level storage shelves 6, which are arranged in the vertical direction Z, and a plurality of transport carriages 7, which travel in the longitudinal direction X (i.e. the longitudinal direction of the storage shelves 6 installed at the respective levels). A pair of storage shelves 6 are provided at each of the multiple levels, in a state of being arranged with a gap therebetween in the width direction Y. One transport carriage 7 is provided between the two storage shelves 6 at each of the multiple levels.

Each of the plurality of automated storages 1 also includes first relay portions 9, which serve as relay portions and are installed at the respective levels, and a first lift base 10 serving as a lift base capable of being raised and lowered. The plurality of first relay portions 9 and one first lift base 10 are installed on the first longitudinal direction X1 side of the storage shelves 6 (i.e. one side in the longitudinal direction X). More specifically, the plurality of first relay portions 9 are arranged on the first longitudinal direction X1 side of the storage shelves 6. The first lift base 10 is arranged on the first longitudinal direction X1 side of the plurality of first relay portions 9.

As shown in FIGS. 1 to 3, each of the plurality of automated storages 1 includes second relay portions 11, which are installed at the respective levels, and a second lift base 12 capable of being raised and lowered. The plurality of second relay portions 11 and one second lift base 12 are installed on the second longitudinal direction X2 side of the storage shelves 6 (i.e. the other side in the longitudinal direction X). More specifically, the plurality of second relay portions 11 are arranged on the second longitudinal direction X2 side of the storage shelves 6. The second lift base 12 is arranged on the second longitudinal direction X2 side of the plurality of second relay portions 11.

Each of the plurality of automated storages 1 loads, at each of the multiple levels, an article W from outside the automated storage 1 to the first lift base 10, transports the article W from the first lift base 10 to one of the first relay portions 9 with the first lift base 10 having been raised or lowered to the height corresponding to the first relay portion 9, and then transports the article W from the first relay portion 9 to a corresponding storage shelf 6 using a corresponding transport carriage 7.

Also, each of the plurality of automated storages 1 loads, at each of the multiple levels, an article W from outside the automated storage 1 to the second lift base 12, transports the article W from the second lift base 12 to one of the second relay portions 11 with the second lift base 12 having been raised or lowered to the height corresponding to the second relay portion 11, and transports the article W from the second relay portion 11 to a corresponding storage shelf 6 using a corresponding transport carriage 7.

Thus, each of the plurality of automated storages 1 is configured to load articles W to be stored on the storage shelves 6 from the first lift base 10 or the second lift base 12 into the automated storage 1, and can load articles W from both the first longitudinal direction X1 and the second longitudinal direction X2 of the automated storage 1.

Also, as shown in FIGS. 1 to 4, each of the plurality of automated storages 1 includes third relay portions 13, which are installed at the respective levels, and a third lift base 14 capable of being raised and lowered. More specifically, the plurality of third relay portions 13 are arranged on the first longitudinal direction X1 side of the storage shelves 6. The third lift base 14 is arranged on the first longitudinal direction X1 side of the plurality of third relay portions 13.

Each of the plurality of automated storages 1 loads, at each of the multiple levels, an article W from one of the storage shelves 6 to a corresponding third relay portion 13 using a corresponding transport carriage 7, transports the article W from the third relay portion 13 to the third lift base 14 with the third lift base 14 having been raised or lowered to the height corresponding to the third relay portion 13, and unloads the article W from the third lift base 14 to the outside of the automated storage 1.

Thus, each of the plurality of automated storages 1 is configured to unload articles W stored on the storage shelves 6 from the third lift base 14 to the outside of the automated storage 1, and can unload articles W only from the first longitudinal direction X1 side of the automated storage 1.

1-2. Loading Transport Device

The loading transport device 2 includes a plurality of first transport conveyors 16, which serve as a plurality of transport conveyors, and a plurality of second transport conveyors 17.

Each of the plurality of first transport conveyors 16 includes a first receiving portion 19 for receiving loaded articles W, first loading portions 18 for delivering articles W transported by the first transport conveyor 16 to the first lift bases 10 to load the articles W to the automated storages 1, and a first transport portion 20 for transporting articles W received at the first receiving portion 19 to the first loading portions 18. The first receiving portion 19 is located in a loading region E1.

Each of the plurality of second transport conveyors 17 includes a second receiving portion 22 for receiving loaded articles W, second loading portions 21 for delivering articles W transported by the second transport conveyor 17 to the second lift bases 12 to load the articles W to the automated storages 1, and second transport portions 23 for transporting articles W received at the second receiving portions 22 to the second loading portions 21. The second receiving portion 22 is located in the loading region E1.

The loading region E1 is a region for taking articles W, which have been loaded, placed in cage carriages K each serving as a carrying body, out of the case carriages K. The loading region E1 is formed on the first width direction Y1 side of the plurality of automated storages 1. The articles W in the cage carriages K are taken out of these case carriages K and are placed onto the first receiving portions 19 of the first transport conveyors 16 or the second receiving portions 22 of the second transport conveyors 17, by an operator. Articles W placed on the first receiving portions 19 are transported by the first transport conveyors 16. Articles W placed on the second receiving portions 22 are transported by the second transport conveyors 17.

The loading region E1 includes a plurality of loading locations E3, at which the first receiving portions 19 and the second receiving portions 22 are arranged. Each of the plurality of loading locations E3 is a location at which an operation to take articles W out of a cage carriage K is performed. Only one of at least either the first receiving portions 19 or the second receiving portions 22 is provided at each of the plurality of loading locations E3. One of the first transport conveyors 16 or one of the second transport conveyors 17 is provided for each of the plurality of loading locations E3.

The first transport portion 20 provided in each of the plurality of first transport conveyors 16 is installed such that the movement trajectory of articles W transported by the first transport portion 20 does not overlap the movement trajectories of articles W transported by the other first transport portions 20 and the movement trajectories of articles W transported by the plurality of second transport portions 23. For this reason, each first transport portion 20 transports articles W placed on the corresponding first receiving portion 19 to the first loading portions 18 provided for this first transport portion 20, without passing the articles W to the other first transport portions 20 or the second transport portions 23.

Also, the second transport portions 23 provided in each of the plurality of second transport conveyors 17 are installed such that the movement trajectory of articles W transported by the second transport portion 23 does not overlap the movement trajectories of articles W transported by the other second transport portions 23 and the movement trajectories of articles W transported by the plurality of first transport portions 20. For this reason, each second transport portion 23 transports articles W placed on the corresponding second receiving portion 22 to the second loading portions 21 provided for this second transport portion 23, without passing the articles W to the other second transport portions 23 or the first transport portions 20.

Next, a description will be given while focusing on one of the plurality of first transport conveyors 16.

The first loading portions 18 are provided for the respective automated storages 1, and each one of the first transport conveyors 16 includes a plurality of first loading portions 18 (the same number of first loading portions 18 as the number of automated storages 1). The plurality of first loading portions 18 provided in each one of the first transport conveyors 16 are installed at the same height. The plurality of first loading portions 18 are arranged on the first longitudinal direction X1 side of the first lift bases 10. Thus, the plurality of first loading portions 18 of each first transport conveyor 16 are installed on the first longitudinal direction X1 side of the plurality of automated storages 1.

Each one of the first transport conveyors 16 is provided with only one first receiving portion 19. The one first receiving portion 19 of each first transport conveyor 16 is installed on the first width direction Y1 side of the plurality of automated storages 1.

The first transport portion 20 of each one of the first transport portions 16 includes one first upstream portion and a plurality of first downstream portions. The first upstream portion extends from the first width direction Y1 side of the plurality of automated storages 1 toward the first longitudinal direction X1 side of the plurality of automated storages 1, and transports articles W along one transport path. The plurality of first downstream portions are provided for the respective first loading portions 18, and are installed between the first upstream portion and the plurality of first loading portions 18. Each one of the first transport conveyors 16 transports articles W received at the one first receiving portion 19 through the first upstream portion, then branches the articles W into the plurality of first downstream portions, and transports the articles W to the plurality of first loading portions 18 through the plurality of first downstream portions.

Next, a description will be given while focusing on one of the plurality of second transport conveyors 17.

The second loading portions 21 are provided for the respective automated storages 1, and each one of the second transport conveyors 17 includes a plurality of second loading portions 21 (the same number of second loading portions 21 as the number of automated storages 1). The plurality of second loading portions 21 provided in each one of the second transport conveyors 17 are installed at the same height. The plurality of second loading portions 21 are arranged on the second longitudinal direction X2 side of the second lift bases 12. Thus, the plurality of second loading portions 21 of each second transport conveyor 17 are installed on the second longitudinal direction X2 side of the plurality of automated storages 1.

Each one of the second transport conveyors 17 is provided with only one second receiving portion 22. The one second receiving portion 22 of each second transport conveyor 17 is installed on the first width direction Y1 side of the plurality of automated storages 1.

The second transport portion 23 of each one of the second transport portions 17 includes one second upstream portion and a plurality of second downstream portions. The second upstream portion extends from the first width direction Y1 side of the plurality of automated storages 1 toward the second longitudinal direction X2 side of the plurality of automated storages 2, and transports articles W along one transport path. The plurality of second downstream portions are provided for the respective second loading portions 21, and are installed between the second upstream portion and the plurality of second loading portions 21. Each one of the second transport conveyors 17 transports articles W received at the one second receiving portion 22 through the second upstream portion, then branches the articles W into the plurality of second downstream portions, and transports the articles W to the plurality of second loading portions 21 through the plurality of second downstream portions.

The first loading portions 18 of each of the plurality of first transport conveyors 16 are installed for each one of the automated storages 1. That is to say, a plurality of first loading portions 18 are installed to deliver articles W to the first lift base 10 of each one of the automated storages 1. These first loading portions 18 are installed at different heights, and are installed at the same position in the longitudinal direction X and the width direction Y.

Also, the second loading portions 21 of each of the plurality of second transport conveyors 17 are installed for each one of the automated storages 1. That is to say, a plurality of second loading portions 21 are installed to deliver articles W to the second lift base 12 of each one of the automated storages 1. These second loading portions 21 are installed at different heights, and are installed at the same position in the longitudinal direction X and the width direction Y.

The first receiving portions 19 of the plurality of first transport conveyors 16 and the second receiving portions 22 of the plurality of second transport conveyors 17 are installed in the loading region E1. That is to say, a plurality of first receiving portions 19 (the same number of first receiving portions 19 as the number of first transport conveyors 16) and a plurality of second receiving portions 22 (the same number of second receiving portions 22 as the number of second transport conveyors 17) are installed in the loading region E1. The plurality of first receiving portions 19 and the plurality of second receiving portions 22 are arranged in a line in the longitudinal direction X, and are installed above a floor surface F at the same height therefrom.

1-3 Unloading Transport Device

The unloading transport device 3 includes a plurality of third transport conveyors 26.

Each of the plurality of third transport conveyors 26 includes a plurality of third receiving portions 28 for receiving articles W unloaded from the third lift bases 14 of the plurality of automated storages 1, a stacking portion 27 located in a stacking region E2 for stacking articles W transported by the third transport conveyor 26 in a cage carriage K, and a third transport portion 29 for transporting articles W received at the plurality of third receiving portions 28 to the stacking portion 27.

The stacking region E2 is a region for placing articles W transported by the unloading transport device 3 in cage carriages K. The stacking region E2 is formed on the first longitudinal direction X1 side of the plurality of automated storages 1. Articles W transported to the stacking portion 27 of each third transport conveyor 26 are stacked in a cage carriage K by an operator.

The third transport portion 29 provided in each of the plurality of third transport conveyors 26 is installed such that the movement trajectory of articles W transported by the third transport portion 29 does not overlap the movement trajectories of articles W transported by the other third transport portions 29. Also, the third transport portion 29 provided in each of the plurality of third transport conveyors 26 are installed such that the movement trajectories of articles W transported by the third transport portion 29 do not overlap the moving trajectories of articles W transported by the plurality of first transport conveyors 16 and the moving trajectories of articles W transported by the plurality of second transport conveyors 17. For this reason, each third transport portion 29 transports articles W placed on the third receiving portions 28 to one stacking portion 27 provided for this third transport portion 29, without delivering these articles W to the other third transport portions 29, the first transport portions 20, or the second transport portions 23.

Next, a description will be given while focusing on one of the plurality of third transport conveyors 26.

Each one of the third transport conveyors 26 is provided with one third receiving portion 28 for each one of the automated storages 1, and each one of the third transport conveyors 26 is provided with only one stacking portion 27. The one stacking portion 27 of each third transport conveyor 26 is installed on the first longitudinal direction X1 side of the automated storages 1. The third transport portion 29 of each one of the third transport conveyors 26 is installed straight in the longitudinal direction X, and transports articles W placed on one third receiving portion 28 to one stacking portion 27.

One third receiving portion 28 is installed for each one of the automated storages 1. The one third receiving portion 28 is installed at a height different from the heights of the plurality of first loading portions 18. Specifically, the one third receiving portion 28 is installed at a height lower than the heights of the plurality of first loading portions 18.

The stacking portions 27 of the plurality of third transport conveyors 26 are installed in the stacking region E2. That is to say, a plurality of stacking portions 27 (the same number of stacking portions 27 as the number of third transport conveyors 26) are installed in the stacking region E2. These stacking portions 27 are arranged in a line in the width direction Y, and are installed above the floor surface F at the same height therefrom.

1-4. Frame

As shown in FIG. 2, the article transport facility includes a first frame DA, which is installed above the floor surface F and parallel thereto. The automated storages 1 are installed on the floor surface F, some of the multiple-level storage shelves 6 are installed above the first frame DA, and the remaining multiple-level storage shelves 6 are installed below the first frame DA. Some of the plurality of first loading portions 18 and some of the plurality of second loading portions 21 are installed on the first frame DA.

A first lower frame D1 and a first upper frame D2 installed above the first lower frame D1 are provided as the first frame DA.

An upper end of each automated storage 1 is located above the first upper frame D2, and the storage shelves 6 of each automated storage 1 are installed between the floor surface F and the first lower frame D1 and above the first lower frame D1.

The plurality of first loading portions 18 include a first loading portion 18 installed on the floor surface F, a first loading portion 18 installed on the first lower frame D1, and a first loading portion 18 installed on the first upper frame D2. The plurality of second loading portions 21 include a second loading portion 21 installed on the floor surface F, a second loading portion 21 installed on the first lower frame D1, and a second loading portion 21 installed on the first upper frame D2. The stacking portions 27 and the third receiving portions 28 of the third transport conveyors 26 are installed on the floor surface F.

1-5. Transportation

Articles W transported into the loading region E1 by a truck or the like are placed onto the plurality of first receiving portions 19, transported by the first transport conveyors 16, and are loaded into any of the plurality of automated storages 1, or are placed onto the plurality of second receiving portions 22, transported by the second transport conveyors 17, and are loaded into any of the plurality of automated storages 1.

One or more shipping destinations are assigned, in advance, to the plurality of automated storages 1, and one shipping destination is assigned to each of the articles W loaded into the loading region E1. Each article W transported by the first transport conveyors 16 or the second transport conveyors 17 is transported so as to be loaded into the automated storage 1 to which the same shipping destination as that of the article is assigned. By thus loading articles W to the automated storages 1, the articles W are loaded into the plurality of automated storages 1 while being sorted by shipping destination. The shipping destinations are assigned to the plurality of automated storages 1 such that loaded articles W are distributed to the plurality of automated storages 1.

Articles W with a shipping destination assigned to one of the automated storages 1 are transported to a corresponding one of the plurality of stacking portions 27. Articles W are unloaded from the automated storages 1 to the plurality of stacking portions 27 so as to be transported thereto in reverse order of the shipping order of the articles W that are to be shipped in a preset period (e.g. a day). Articles W transported to the stacking portions 27 are stacked in cage carriages K separately for the respective shipping destinations, and are shipped thereto in a state of being placed in the cage carriages K.

2. Second Embodiment

Next, the second embodiment of the article transport facility will be described with reference to FIGS. 5 to 8. In this embodiment, the configurations of the automated storages 1, the loading transport device 2, and the unloading transport device 3 differ from those of the first embodiment. The following description will describe the configurations of the automated storages 1, the loading transport device 2, and the unloading transport device 3 according to this embodiment, mainly regarding differences from the first embodiment. Note that features that are not specifically described are the same as those of the first embodiment.

2-1. Automated Storage

Figure 5:
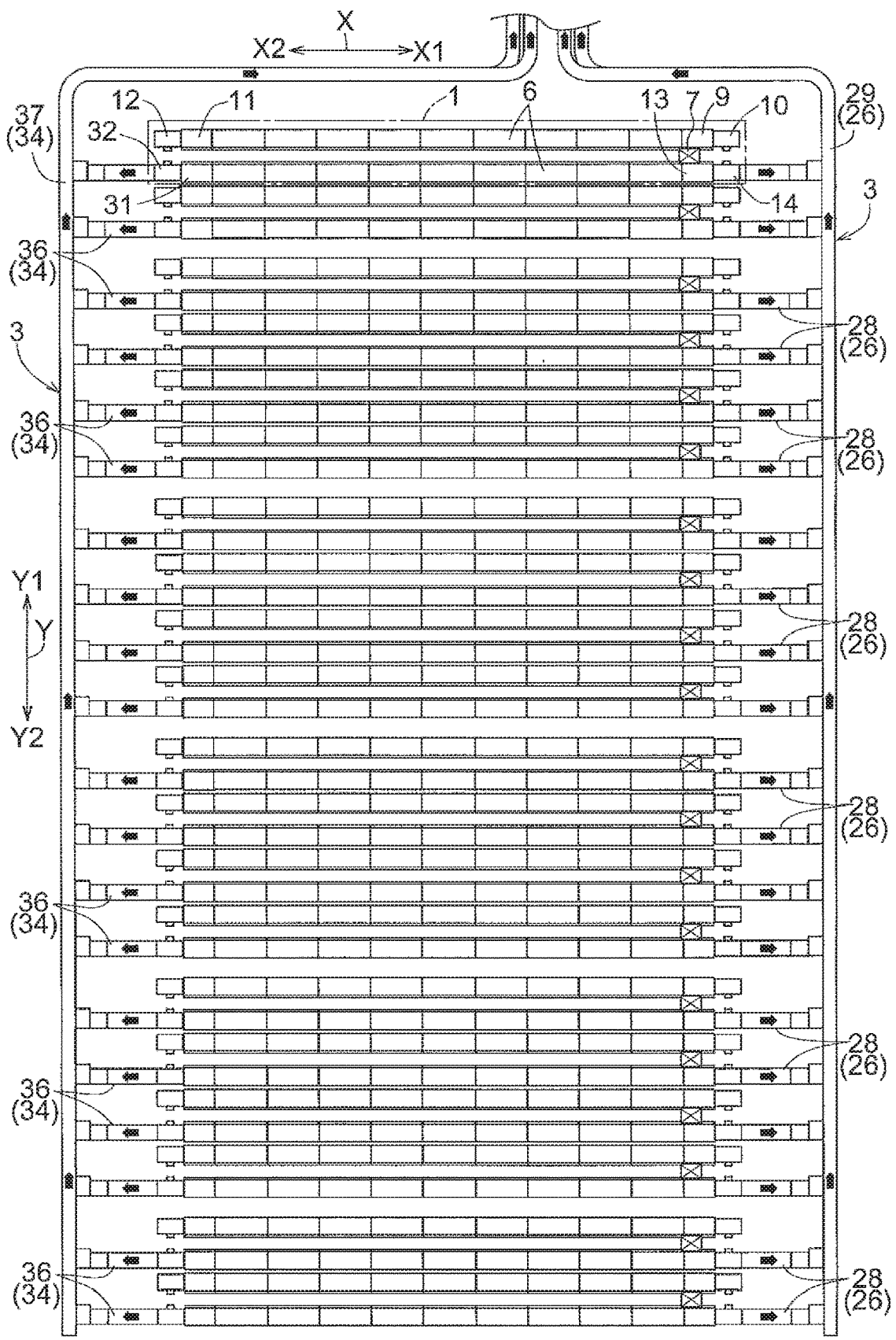
FIG. 5 is a plan view illustrating a second transport device in an article transport facility according to a second embodiment.
Figure 6:
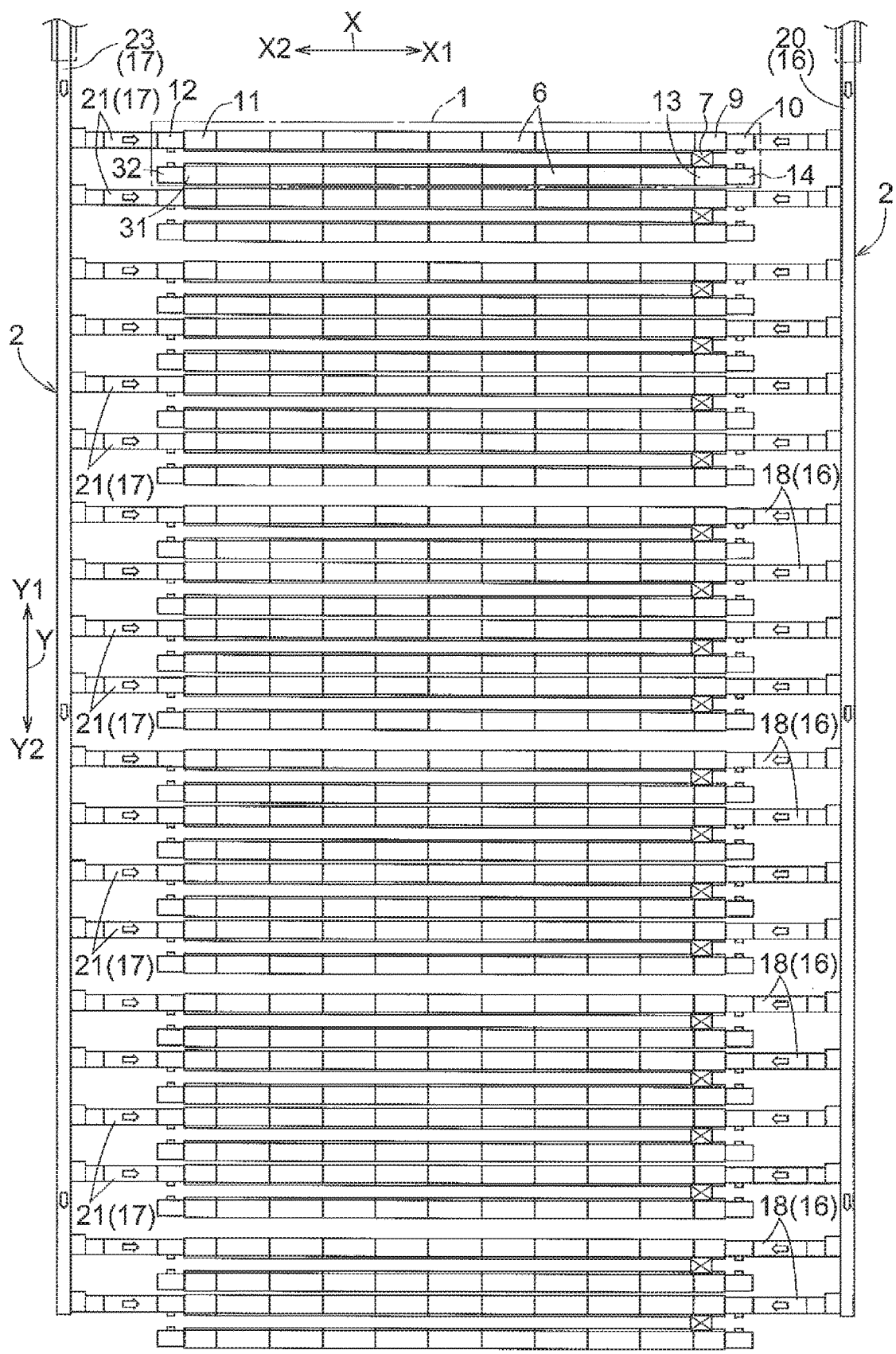
FIG. 6 is a plan view illustrating a first transport device in the article transport facility according to a second embodiment.
Figure 8:
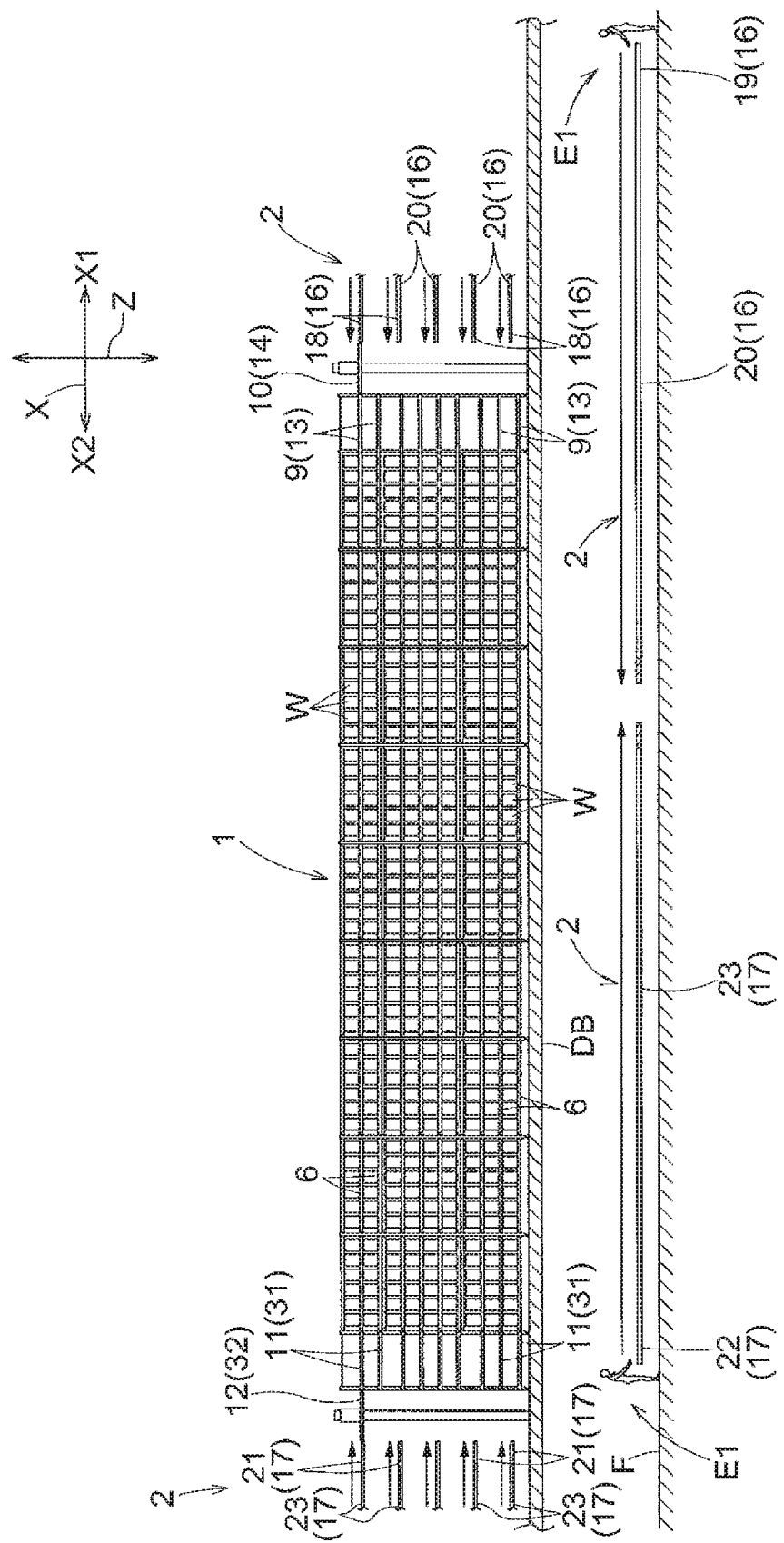
FIG. 8 is a front elevational view of the article transport facility according to the second embodiment.

As shown in FIGS. 5, 6, and 8, each of a plurality of automated storages 1 includes fourth relay portions 31, which are installed at the respective levels, and a fourth lift base 32 capable of being raised and lowered. A plurality of fourth relay portions 31 and one fourth lift base 32 are installed on the second longitudinal direction X2 side of the storage shelves 6. More specifically, the plurality of fourth relay portions 31 are arranged on the second longitudinal direction X2 side of the storage shelves 6. The fourth lift base 32 is arranged on the second longitudinal direction X2 side of the plurality of fourth relay portions 31.

Each of the plurality of automated storages 1 transports, at each of the multiple levels, an article W from one of the storage shelves 6 to a corresponding fourth relay portion 31 using the transport carriage 7, transports the article W from the fourth relay portion 31 to the fourth lift base 32 with the fourth lift base 32 having been raised or lowered to the height corresponding to the fourth relay portion 31, and unloads the article W from the fourth lift base 32 to the outside of the automated storage 1.

Thus, each of the plurality of automated storages 1 is configured to be able to unload articles W stored on the storage shelves 6 from the fourth lift base 32, in addition to the third lift base 14, to the outside of the automated storage 1, and can unload articles W from both the first longitudinal direction X1 and the second longitudinal direction X2 of the automated storage 1.

2-2. Loading Transport Device

Figure 7:
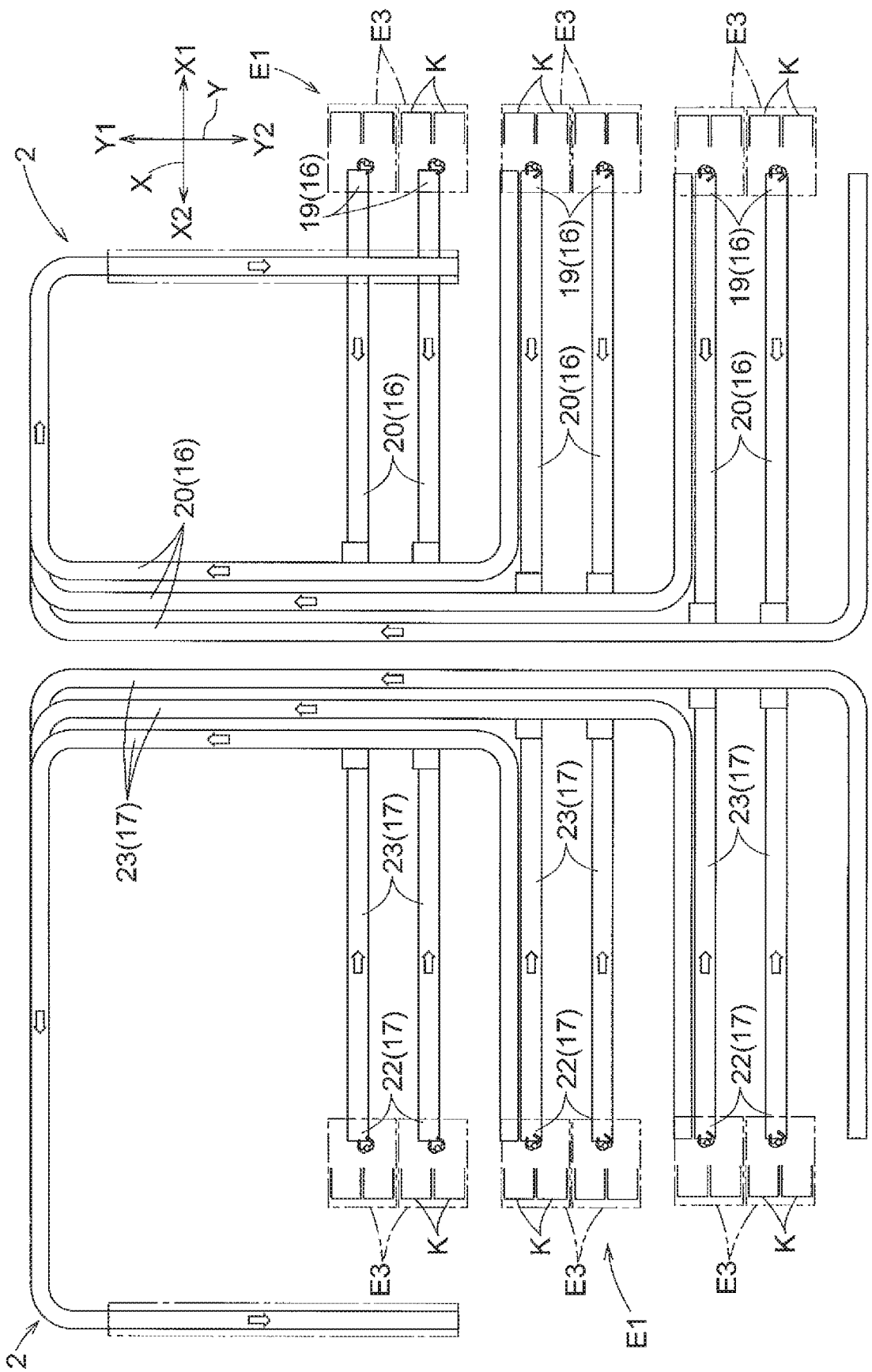
FIG. 7 is a plan view of loading regions according to the second embodiment.

As shown in FIGS. 6 and 7, each of the plurality of first transport conveyors 16 includes a plurality of first loading portions 18, a plurality of first receiving portions 19, and a first transport portion 20 for transporting articles W received at the plurality of first receiving portions 19 to the plurality of first loading portions 18.

As shown in FIGS. 6 and 7, each of the plurality of second transport conveyors 17 includes a plurality of second loading portions 21, a plurality of second receiving portions 22, and a second transport portion 23 for transporting articles W received at the plurality of second receiving portions 22 to the plurality of loading portions 21.

As shown in FIGS. 7 and 8, loading regions E1 are formed on both the first longitudinal direction X1 side and the second longitudinal direction X2 side of the plurality of automated storages 1. The plurality of first receiving portions 19 are provided in the loading region E1 located on the first longitudinal direction X1 side of the plurality of automated storages 1, and the plurality of second receiving portions 22 are provided in the loading region E1 located on the second longitudinal direction X2 side of the plurality of automated storages 1.

Each one of the first transport conveyors 16 is provided with a plurality of first receiving portions 19. In this embodiment, one first transport conveyor 16 is provided with two first receiving portions 19. The plurality of first receiving portions 19 of each first transport conveyor 16 are installed below the automated storages 1, on the first longitudinal direction X1 side thereof.

The first transport portion 20 of each one of the first transport portions 16 includes one first intermediate portion, a plurality of first upstream portions, and a plurality of downstream portions. The first intermediate portion extends from the first longitudinal direction X1 side toward the first width direction Y1 side of the plurality of automated storages 1, and below the plurality of automated storages 1, and transports articles W along one transport path. The first upstream portions are provided for the respective first receiving portions 19, and are installed between the first intermediate portion and the first receiving portions 19. The first downstream portions are provided for the respective first loading portions 18, and are installed between the first intermediate portion and the first loading portions 18. Each one of the first transport conveyors 16 separately transports articles W received at the plurality of first receiving portions 19 through the plurality of first upstream portions, then causes the articles W to merge into one first intermediate portion, and thereafter branches the articles W into the plurality of first downstream portions to transport the articles W to the plurality of first loading portions 18.

Each one of the second transport conveyors 17 is provided with a plurality of second receiving portions 22. In this embodiment, each one of the second transport conveyors 17 is provided with two second receiving portions 22. The plurality of second receiving portions 22 of each second transport conveyor 17 are installed below the automated storages 1, on the second longitudinal direction X2 side thereof.

The second transport portion 23 of each one of the second transport conveyors 17 includes one second intermediate portion, a plurality of second upstream portions, and a plurality of second downstream portions. The second intermediate portion extends from the second longitudinal direction X2 side toward the first width direction Y1 side of the plurality of automated storages 1, and below the plurality of automated storages 1, and transports articles W along one transport path. The second upstream portions are provided for the respective second receiving portions 22, and are installed between the second intermediate portion and the plurality of second receiving portions 22. The second downstream portions are provided for the respective second loading portions 21, and are installed between the second intermediate portion and the second loading portions 21. Each one of the second transport conveyors 17 separately transports articles W received at the plurality of second receiving portions 22 through the plurality of second upstream portions, then causes the articles W to merge into one second intermediate portion, and thereafter branches the articles W into the plurality of second downstream portions to transport the articles W to the plurality of second loading portions 21.

2-3 Unloading Transport Device

As shown in FIG. 5, the unloading transport device 3 includes a plurality of fourth transport conveyors 34, in addition to the plurality of third transport conveyors 26.

Each of the plurality of fourth transport conveyors 34 includes a plurality of fourth receiving portions 36 for receiving articles W unloaded from the fourth lift bases 32 of the plurality of automated storages 1, a fourth stacking portion (not shown) located in a stacking region E2 for stacking articles W transported by the fourth transport conveyor 34 in a cage carriage K, and a fourth transport portion 37 for transporting articles W received by the plurality of fourth receiving portions 36 to the fourth stacking portion.

Each of the plurality of third transport conveyors 26 includes a plurality of third receiving portions 28 (not shown in this embodiment), a plurality of stacking portions 27, and a third transport portion 29 for transporting articles W received at the plurality of third receiving portions 28 to the plurality of stacking portions 27.

The fourth transport portion 37 provided in each of the plurality of fourth transport conveyors 34 is installed such that the movement trajectory of articles W transported by the fourth transport portion 37 does not overlap the movement trajectories of articles W transported by the other fourth transport portions 37. Also, the fourth transport portion 37 provided each of the plurality of fourth transport conveyors 34 is installed so as not to overlap the movement trajectories of articles W transported by the plurality of first transport conveyors 16, the movement trajectories of articles W transported by the plurality of second transport conveyors 17, and the movement trajectories of articles W transported by the plurality of third transport conveyors 26. For this reason, each fourth transport portion 37 transports articles W placed on the fourth receiving portions 36 to the plurality of fourth stacking portions provided for this fourth transport portion 37, without delivering the articles W to the other fourth transport portions 37, the first transport portions 20, the second transport portions 23, or the third transport portions 29.

Each one of the third transport conveyors 26 is provided with the third receiving portions 28 for the respective automated storages 1, and is thus provided with a plurality of third receiving portions 28 (the same number of third receiving portions 28 as the number of automated storages 1).

Each one of the third transport conveyors 26 is provided with a plurality of receiving portions 28. The third transport portion 29 of each one of the third transport conveyors 26 transports articles W placed on the plurality of third receiving portions 28 to the plurality of stacking portions 27.

Each one of the fourth transport conveyors 34 is provided with a fourth receiving portion 36 for the respective automated storages 1, and is thus provided with a plurality of fourth receiving portions 36 (the same number of fourth receiving portions 36 as the number of automated storages 1).

Each one of the fourth transport conveyors 34 is provided with a plurality of fourth stacking portions. The fourth transport portion 37 of each one of the fourth transport conveyors 34 transports articles W placed on the plurality of fourth receiving portions 36 to the plurality of fourth stacking portions.

A plurality of third receiving portions 28 are installed for each one of the automated storages 1. The plurality of third receiving portions 28 are installed at heights different from the heights of the plurality of first loading portions 18. Specifically, the plurality of first loading portions 18 and the plurality of receiving portions 28 are alternately installed in the vertical direction Z.

A plurality of fourth receiving portions 36 are installed for each one of the automated storages 1. The plurality of fourth receiving portions 36 are installed at heights different from the heights of the plurality of second loading portions 21. Specifically, the plurality of second loading portions 21 and the plurality of fourth receiving portions 36 are alternately installed in the vertical direction Z.

2-4. Frame

As shown in FIG. 8, the article transport facility includes a second frame DB, which is installed above the floor surface F and parallel thereto. The automated storages 1 are installed on the second frame DB, and all of the multiple-level storage shelves 6 are installed above the second frame DB. Also, all of the plurality of loading portions 18 and all of the plurality of second loading portions 21 are installed on the second frame DB. Meanwhile, all of the plurality of first receiving portions 19 and all of the second receiving portions 22 are installed on the floor surface F.

3. Third Embodiment

Next, the third embodiment of the article transport facility will be described with reference to FIGS. 9 to 11. In this embodiment, the configurations of the automated storages 1, the loading transport device 2, and the unloading transport device 3 differ from those of the first embodiment and the second embodiment. The following description will describe the configurations of the automated storages 1, the loading transport device 2, and the unloading transport device 3 according to this embodiment, mainly regarding differences from the first embodiment. Note that features that are not particularly described are the same as those of the first embodiment.

3-1. Automated Storage

Figure 9:
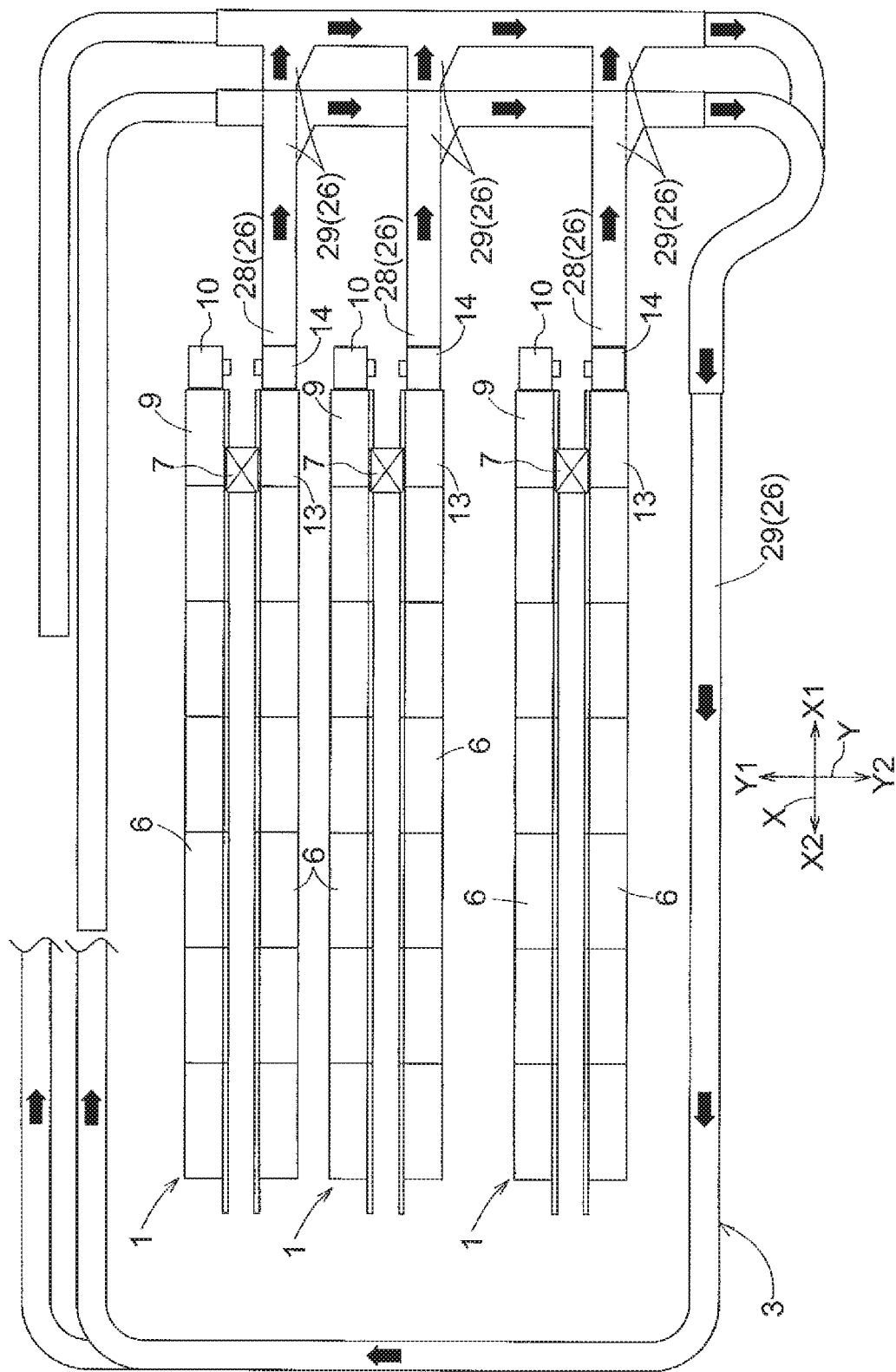
FIG. 9 is a plan view illustrating a second transport device in an article transport facility according to a third embodiment.

As shown in FIGS. 9 to 11, each of the plurality of automated storages 1 includes the first relay portions 9, the first lift base 10, the third relay portions 13, and the third lift base 14, but does not include the second relay portions 11 and the second lift base 12.

That is to say, each of the plurality of automated storages 1 is configured to load articles W to be stored on the storage shelves 6 from the first lift base 10 to the automated storage 1, and can load articles W only from the first longitudinal direction X1 side of the automated storage 1.

Also, each of the plurality of automated storages 1 is configured to unload articles W stored on the storage shelves 6 from the third lift base 14 to the outside of the automated storage 1, and can unload articles W only from the first longitudinal direction X1 side of the automated storage 1.

3-2. Loading Transport Device and Unloading Transport Device

The loading transport device 2 includes the plurality of first transport conveyors 16, but does not include the plurality of second transport conveyors 17.

Each of the plurality of first transport conveyors 16 includes a plurality of first receiving portions 19 (not shown in this embodiment) for receiving loaded articles W, a plurality of first loading portions 18 for delivering articles W transported by the first transport conveyor 10 to the first lift base 10 to load the articles W to the automated storages 1, and a first transport portion 20 for transporting articles W received at the first receiving portions 19 to the first loading portions 18.

The unloading transport device 3 includes the plurality of third transport conveyors 26, but does not include the plurality of fourth transport conveyors 34.

Each of the plurality of third transport conveyors 26 includes a plurality of third receiving portions 28 for receiving articles W unloaded from the third lift bases 14 of the plurality of automated storages 1, one stacking portion 27 located in the stacking region E2, and a third transport portion 29 for transporting articles W received at the plurality of third receiving portions 28 to the one stacking portion 27.

3-3. Frame

As shown in FIG. 11, the article transport facility includes a first frame DA, which is installed above the floor surface F and parallel thereto. The automated storages 1 are installed on the floor surface F, some of the multiple-level storage shelves 6 are installed above the first frame DA, and the remaining multiple-level storage shelves 6 are installed below the first frame DA. The plurality of stacking portions 27 and the plurality of third receiving portions 28 are installed on the floor surface F, and the plurality of first loading portions 18 and the plurality of first receiving portions 19 are installed on the first frame DA. Upper ends of the automated storages 1 are located above the first frame DA, and the storage shelves 6 of the automated storages 1 extend from the lower side toward the upper side of the first frame DA.

4. Other Embodiments

Next, other embodiments of the article transport facility will be described.

(1) In the above embodiments, the third receiving portions 28 are installed on the same side, in the longitudinal direction X, of the plurality of automated storages 1 as the side on which the first loading portions 18 are installed. However, the third receiving portions 28 may alternately be installed on a side, in the longitudinal direction X, of the plurality of automated storages 1 different from the side on which the first loading portions 18 are installed.

(2) In the first embodiment, each of the first transport conveyors 16 includes only one first receiving portion 19, but may alternatively include a plurality of first receiving portions 19. Also, each of the second transport conveyors 17 includes only one second receiving portion 22, but may alternatively include a plurality of second receiving portions 22.

In the second embodiment, each of the first transport conveyors 16 includes a plurality of first receiving portions 19, but may alternatively include only one first receiving portion 19. Also, each of the second transport conveyors 17 includes a plurality of second receiving portions 22, but may alternatively include only one second receiving portion 22.

In the third embodiment, each of the first transport conveyors 16 includes only one first receiving portion 19, but may alternatively include a plurality of first receiving portions 19.

(3) In the first and second embodiments, the loading transport device 2 includes both the first transport conveyors 16 and the second transport conveyors 17, but may alternatively include only the first transport conveyors 16, of the first transport conveyors 16 and the second transport conveyors 17.

In the third embodiment, the loading transport device 2 includes only the first transport conveyors 16, of the first transport conveyors 16 and the second transport conveyors 17, but may alternatively include both the first transport conveyors 16 and the second transport conveyors 17.

(4) In the first and third embodiments, the unloading transport device 3 includes only the third transport conveyors 26, of the third transport conveyors 26 and fourth transport conveyors 34, but may alternatively include both the third transport conveyors 26 and the fourth transport conveyors 34.

In the second embodiment, the unloading transport device 3 includes both the third transport conveyors 26 and the fourth transport conveyors 34, but may alternatively include only the third transport conveyors 26, of the third transport conveyors 26 and the fourth transport conveyors 34.

(5) In the above embodiments, the first frame DA or the second frame DB is provided above the floor surface F, but need not be provided. If the first frame DA or the second frame DB is provided, the positional relationship between the first frame DA or the second frame DB, the automated storages 1, the loading transport device 2, and the unloading transport device 3 may be modified as appropriate.

That is to say, in the first embodiment, the second frame DB may be provided in addition to or in place of the first frame DA, and the automated storages 1 may be installed on the second frame DB. In the second embodiment, the first receiving portions 19 may be installed on the second frame DB. The third embodiment may also employ a configuration in which the plurality of first loading portions 18 and the plurality of first receiving portions 19 are installed on the first frame DA, and the plurality of stacking portions 27 and the plurality of third receiving portions 28 are installed on the floor surface F.

(6) Note that the configurations disclosed in each of the above embodiments may also be combined with the configurations disclosed in the other embodiments. As to other configurations as well, the embodiments disclosed in the present specification are merely examples in all respects. Accordingly, various alterations may be made as appropriate without departing from the gist of the present disclosure.

5. Summary of the Embodiments

A summary of the above-described article transport facility will be described below.

An article transport facility includes: a plurality of automated storages: and a transport device configured to transport articles to be loaded into the plurality of automated storages, wherein each of the plurality of automated storages includes: storage shelves with multiple levels arranged in a vertical direction; a plurality of transport carriages configured to travel in a longitudinal direction of the storage shelves, the plurality of transport carriages being installed at the respective multiple levels; a plurality of relay portions installed at the respective multiple levels; and a lift base capable of being lifted and lowered, and is configured to load, at each of the multiple levels, articles from outside the automated storage to the lift base, to transport the articles from the lift base to the relay portions, with the lift base having been raised or lowered to heights corresponding to the relay portions, and to transport the articles from the relay portions to the storage shelves using the transport carriages, the transport device includes a plurality of transport conveyors, each of the plurality of transport conveyors includes: a receiving portion configured to receive articles; a plurality of loading portions configured to deliver articles transported by the transport conveyor to the lift bases of the plurality of automated storages, and to load the articles to the automated storages; and a transport portion configured to transport articles received at the receiving portion to the plurality of loading portions, the transport portion included in each of the plurality of transport conveyors is installed such that a movement trajectory of articles transported by the transport portion does not overlap a movement trajectory of articles transported by another transport portion, and a plurality of the loading portions that deliver articles to the lift base of each one of the automated storages are installed at different heights.

According to this configuration, the transport device includes the plurality of transport conveyors configured to transport articles from the receiving portion to the plurality of loading portions. Since each of the plurality of transport conveyors includes the loading portions for the respective automated storages, each transport conveyor can load articles transported thereby to any of the plurality of automated storages.

Articles to be loaded into the plurality of automated storages are transported to the plurality of loading portions by the plurality of transport conveyors, and thus, the number of articles transported by each one of the transport conveyors is reduced. Thus, articles are not likely to jam when being transported by the plurality of transport conveyors, and articles received at the receiving portions can be efficiently transported to the loading portions.

Also, the movement trajectory of articles transported by the transport portion of each of the plurality of transport conveyors does not overlap the movement trajectories of articles transported by the other transport portions. Thus, for example, articles that are being transported by the plurality of transport conveyors will not interfere with each other: e.g. an article does not move between two transport conveyors. Accordingly, articles received at the receiving portions can be efficiently transported in this regard as well.

Here, it is preferable that, in addition to the relay portions serving as first relay portions and the lift base serving as a first lift base, each of the plurality of automated storages also includes a second relay portion and a second lift base, the first relay portions and the first lift base are installed on one side, in the longitudinal direction, of the storage shelves, and the second relay portion and the second lift base are installed on another one side, in the longitudinal direction, of the storage shelves, in addition to the plurality of transport conveyors serving as a plurality of first transport conveyors, the transport device also includes a plurality of second transport conveyors, each of the plurality of first transport conveyors is installed such that a movement trajectory of articles transported by each of the plurality of first transport conveyors does not overlap a movement trajectory of articles transported by another first transport conveyor and movement trajectories of articles transported by the plurality of second transport conveyors, each of the plurality of second transport conveyors includes: a second receiving portion configured to receive articles; a second loading portion configured to deliver articles transported by the second transport conveyor to the second lift base, and to load the articles to the automated storages, and a second transport portion configured to transport articles received at the second receiving portion to the second loading portion, the second transport portion included in each of the plurality of second transport conveyors is installed such that a movement trajectory of articles transported by the second transport portion does not overlap a movement trajectory of articles transported by another second transport portion, and movement trajectories of articles transported by the transport portions of the plurality of first transport conveyors, and a plurality of the second loading portions that deliver articles to the second lift base of each one of the automated storages are installed at different heights.

According to this configuration, articles received at the receiving portion are transported by the first transport conveyors, and are loaded into the storage shelves from the first lift base installed on one side, in the longitudinal direction, of the storage shelves. Articles received at the second receiving portion are transported by the second transport conveyors, and are loaded into the storage shelves from the second lift base installed on the other side, in the longitudinal direction, of the storage shelves. Thus, each of the automated storages can load articles from both the one side and the other side, in the longitudinal direction, of the storage shelves.

Furthermore, the transport device includes the plurality of transport conveyors configured to transport articles to be loaded to the first lift bases of the plurality of automated storages, and the plurality of second transport conveyors configured to transport articles to be loaded to the second lift bases of the plurality of automated storages. As a result of the transport device including the plurality of first transport conveyors and the plurality of second transport conveyors, the number of articles to be transported by each one of the first transport conveyors and each one of the second transport conveyors is smaller than in the case of including only either the plurality of first transport conveyors or the plurality of second transport conveyors. Thus, articles are not likely to jam when being transported by the plurality of first transport conveyors and when being transported by the plurality of second transport conveyors, and articles to be loaded into the plurality of automated storages can be transported efficiently.

Also, it is preferable that the article transport facility further includes: a first frame installed parallel to a floor surface and above the floor surface, wherein, of each of the automated storages, some of the storage shelves with the multiple levels are installed above the first frame, and the remaining storage shelves with the multiple levels are installed below the first frame, a plurality of the receiving portions are installed on the floor surface or the first frame, and the plurality of loading portions are installed above the first frame.

According to this configuration, an operation for the loading portions can be readily performed by installing the first frame between the floor surface and the loading portions in the vertical direction. More specifically, if the receiving portions are located above the floor surface and significantly distanced therefrom, it may be difficult for an operator on the floor surface to perform an operation for the loading portions. However, the height of the loading portions is relatively low with respect to the first frame, as a result of installing the first frame between the floor surface and the loading portions in the vertical direction. Thus, an operation for the loading portions can be readily performed by performing the operation for the loading portions on the first frame. Also, in the case of installing a support leg at the loading portions to support the loading portions, the leg can be made relatively short by supporting the leg using the first frame, and the loading portions can be readily supported stably with a simple configuration. Also, by arranging the automated storages such that only some of the multiple-level storage shelves are located above the first frame, an operation for the storage shelves located in the upper portion of the automated storages and an operation for the transport carriages installed for these storage shelves can be readily performed.

Also, it is preferable that the article transport facility further includes: a second frame installed parallel to a floor surface and above the floor surface, wherein the automated storages are installed on the second frame, and a plurality of the receiving portions are installed on the floor surface.

According to this configuration, since the automated storages are installed on the second frame, the space immediately below the automated storages between the floor surface and the second frame can be used as a work space. Also, since the plurality of receiving portions are installed on the floor surface, the plurality of receiving portions and some of the plurality of transport portions that transport articles to these receiving portions can be installed using the space immediately below the automated storages.

Also, it is preferable that a loading region in which a plurality of the receiving portions are arranged has a plurality of loading locations at which the receiving portions are arranged, the plurality of loading locations are locations at which an operation to take articles out of carrying bodies from different shipping origins is performed, and the transport conveyors are provided individually at the plurality of loading locations.

According to this configuration, by providing one receiving portion at one loading location, each transport conveyor does not need to transport articles in a merging manner to sort the articles into the plurality of loading portions, and need only transport articles from one receiving portion along one transport path. Thus, articles can be efficiently transported from the receiving portion.

Also, it is preferable that the article transport facility further includes: a second transport device configured to transport articles unloaded from the plurality of automated storages, wherein each of the plurality of automated storages includes: a plurality of third relay portions installed at the respective multiple levels; and a third lift base capable of being lifted and lowered, and is configured to transport, at each of the multiple levels, articles from the storage shelves to the third relay portions using the transport carriages, to transport the articles from the third relay portions to the third lift base, with the third lift base having been raised or lowered to heights corresponding to the third relay portions, and to unload the articles from the third lift base to the outside of the automated storage, the second transport device includes a plurality of third transport conveyors, each of the plurality of third transport conveyors includes: a plurality of third receiving portions configured to receive articles unloaded from the third lift bases of the plurality of automated storages; a stacking portion located in a stacking region for stacking articles transported by the third transport conveyor onto a carrying body; and a third transport portion configured to transport articles received at the plurality of third receiving portions to the stacking portion, each of the plurality of transport conveyors transports a plurality of articles while sorting the plurality of articles into the automated storages corresponding to shipping destinations of the plurality of articles, and each of the plurality of third transport conveyors transports articles that have been sorted by shipping destination.

According to this configuration, articles to be shipped from the article transport facility are unloaded from any of the plurality of automated storages and are transported by the second transport device. These articles to be shipped are shipped to various shipping destinations, and the plurality of third transport conveyors of the second transport device transport a plurality of articles with different shipping destinations.

Due to the second transport device including the plurality of third transport conveyors, and each of the plurality of third transport conveyors including the third receiving portions for the plurality of automated storages, an article unloaded from any of the plurality of automated storages can be transported to a stacking portion corresponding to the shipping destination of the article.

Thus, articles to be shipped can be transported to stacking portions corresponding to the shipping destinations of these articles by the plurality of third transport conveyors, the plurality of automated storages, and the plurality of transport conveyors, and the article transport facility can be used as a sorting facility for sorting articles by shipping destination.

What is claimed is:

1. An article transport facility comprising:
    a plurality of automated storages: and
    a transport device configured to transport articles to be loaded into the plurality of automated storages; and
    a second transport device configured to transport articles unloaded from the plurality of automated storages,
    wherein each of the plurality of automated storages includes:
    storage shelves with multiple levels arranged in a vertical direction;
    a plurality of transport carriages configured to travel in a longitudinal direction of the storage shelves, the plurality of transport carriages being installed at the respective multiple levels;
    a plurality of relay portions installed at the respective multiple levels; and
    a lift base capable of being lifted and lowered, and is configured to load, at each of the multiple levels, articles from outside the automated storage to the lift base, to transport the articles from the lift base to the relay portions, with the lift base having been raised or lowered to heights corresponding to the relay portions
    wherein the transport carriages are configured to transport the articles from the relay portions to the storage shelves,
    wherein the transport device includes a plurality of transport conveyors,
    wherein each of the plurality of transport conveyors includes:
    a receiving portion configured to receive articles;
    a plurality of loading portions configured to deliver articles transported by the transport conveyor to the lift bases of the plurality of automated storages, and to load the articles to the automated storages; and
    a transport portion configured to transport articles received at the receiving portion to the plurality of loading portions,
    wherein the transport portion included in each of the plurality of transport conveyors includes a horizontal section which extends linearly along a direction in which the plurality of automated storages are arranged and is installed such that a movement trajectory of articles transported by the transport portion does not overlap a movement trajectory of articles transported by another transport portion, wherein a plurality of the loading portions that deliver articles to the lift base of each one of the automated storages are installed at different heights, wherein the second transport device includes a plurality of unloading transport conveyors, wherein the plurality of unloading transport conveyors are installed at the same height, and each of the plurality of unloading transport conveyors is installed along the longitudinal direction of the storage shelves, and wherein the unloading transport conveyor and the horizontal section are installed at different heights, and the unloading transport conveyor and the horizontal section overlap each other in planar view.

2. The article transport facility according to claim 1, wherein, in addition to the relay portions serving as first relay portions and the lift base serving as a first lift base, each of the plurality of automated storages also includes a second relay portion and a second lift base, wherein the first relay portions and the first lift base are installed on one side, in the longitudinal direction, of the storage shelves, and the second relay portion and the second lift base are installed on another one side, in the longitudinal direction, of the storage shelves, wherein in addition to the plurality of transport conveyors serving as a plurality of first transport conveyors, the transport device also includes a plurality of second transport conveyors, wherein each of the plurality of first transport conveyors is installed such that a movement trajectory of articles transported by each of the plurality of first transport conveyors does not overlap a movement trajectory of articles transported by another first transport conveyor and movement trajectories of articles transported by the plurality of second transport conveyors, wherein each of the plurality of second transport conveyors includes:

a second receiving portion configured to receive articles;

a second loading portion configured to deliver articles transported by the second transport conveyor to the second lift base, and to load the articles to the automated storages; and a second transport portion configured to transport articles received at the second receiving portion to the second loading portion, wherein the second transport portion included in each of the plurality of second transport conveyors is installed such that a movement trajectory of articles transported by the second transport portion does not overlap a movement trajectory of articles transported by another second transport portion, and movement trajectories of articles transported by the transport portions of the plurality of first transport conveyors, and wherein a plurality of the second loading portions that deliver articles to the second lift base of each one of the automated storages are installed at different heights.

3. The article transport facility according to claim 1, further comprising:

a frame installed parallel to a floor surface and above the floor surface, wherein, of each of the automated storages, some of the storage shelves with the multiple levels are installed above the frame, and the remaining storage shelves with the multiple levels are installed below the frame, wherein a plurality of the receiving portions are installed on the floor surface or the frame, and wherein the plurality of loading portions are installed above the frame.

4. The article transport facility according to claim 1, further comprising:

a frame installed parallel to a floor surface and above the floor surface, wherein the automated storages are installed on the frame, and a plurality of the receiving portions are installed on the floor surface.

5. The article transport facility according to claim 1, wherein a loading region in which a plurality of the receiving portions are arranged has a plurality of loading locations at which the receiving portions are arranged, wherein the plurality of loading locations are locations at which an operation to take articles out of carrying bodies from different shipping origins is performed, and wherein the transport conveyors are provided individually at the plurality of loading locations.

6. The article transport facility according to claim 5, wherein each of the plurality of automated storages includes:

a plurality of unloading relay portions installed at the respective multiple levels; and a unloading lift base capable of being lifted and lowered, and is configured to transport, at each of the multiple levels, articles from the storage shelves to the unloading relay portions using the transport carriages, to transport the articles from the unloading relay portions to the unloading lift base, with the unloading lift base having been raised or lowered to heights corresponding to the unloading relay portions, and to unload the articles from the unloading lift base to the outside of the automated storage, wherein each of the plurality of unloading transport conveyors includes:

a plurality of unloading receiving portions configured to receive articles unloaded from the unloading lift bases of the plurality of automated storages;

a stacking portion located in a stacking region for stacking articles transported by the unloading transport conveyor onto a carrying body; and a unloading transport portion configured to transport articles received at the plurality of unloading receiving portions to the stacking portion, wherein each of the plurality of transport conveyors transports a plurality of articles while sorting the plurality of articles into the automated storages corresponding to shipping destinations of the plurality of articles, and wherein each of the plurality of unloading transport conveyors transports articles that have been sorted by shipping destination.

7. The article transport facility according to claim 1, wherein the plurality of loading portions included in one of the transport conveyors are installed at the same height, and arranged along a direction in which the plurality of automated storages are arranged, and wherein the plurality of loading portions included in one of the transport conveyors and the plurality of unloading transport conveyors are equal in number.

8. The article transport facility according to claim 1,
wherein the transport portion included in each of the plurality of transport conveyors further includes a slope section having an inclined transport surface,
wherein the horizontal sections included in the plurality of transport portions overlap one another in planar view,
wherein the receiving portion included in each of the plurality of transport conveyors are installed at the same height, and
wherein in each of the plurality of transport conveyors, the receiving portion and the horizontal section in the transport portion are connected via the slope section.

* * * * *